Figure 1:
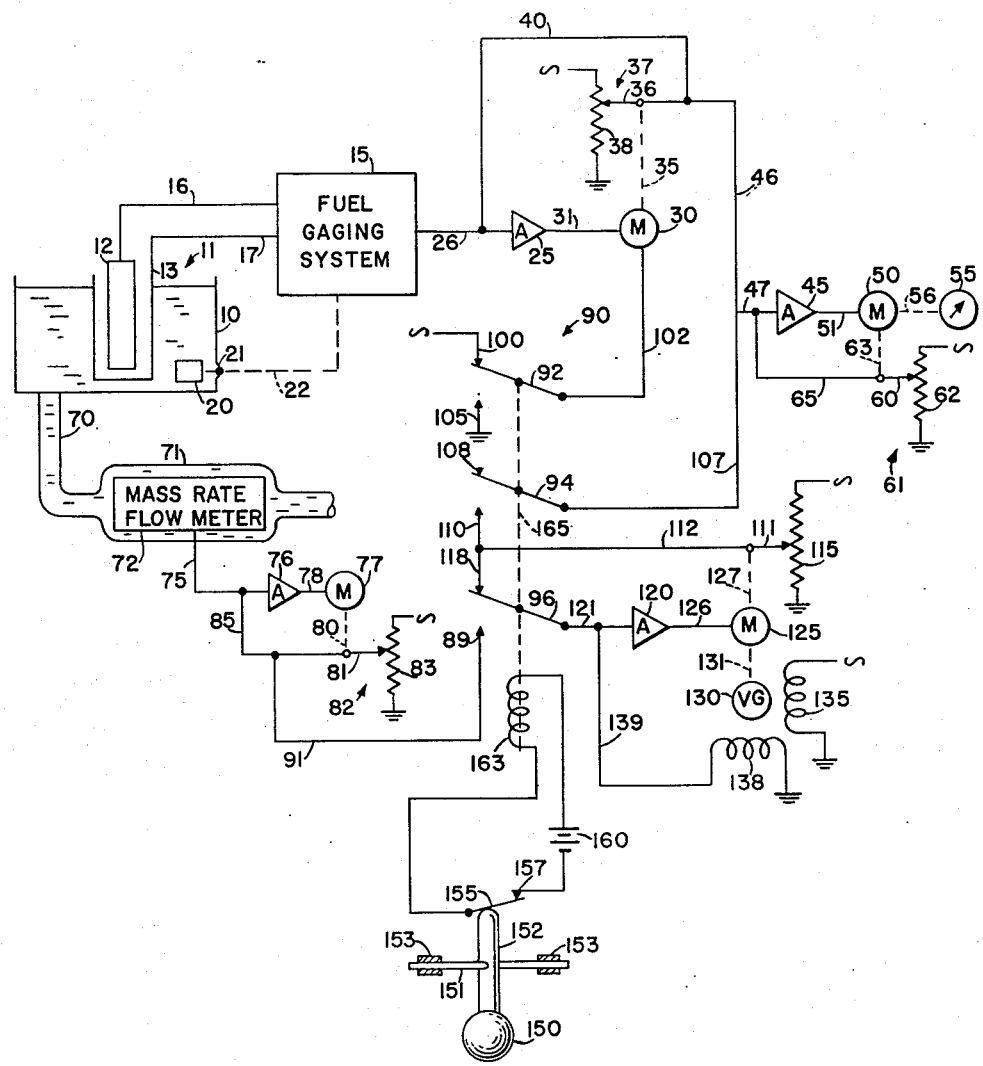

United States Patent Office 3,029,641
Patented Apr. 17, 1962

3,029,641
FUEL GAUGE APPARATUS
Floyd A. Andrews, Minneapolis, Minn., assignor to Minneapolis-Honeywell Regulator Company, Minneapolis, Minn., a corporation of Delaware
Filed Jan. 15, 1958, Ser. No. 709,068
12 Claims. (Cl. 73—291)

This invention relates to fuel gauge apparatus and more particularly to fuel gauging apparatus which can give improved accuracy regardless of the attitude of the container holding the fuel.

In modern day aircraft, particularly of the thin-winged type, considerable error in fuel gauging have been encountered when using a capacitive type fuel gauging system because with change in attitude of the aircraft, the fuel in the tank distributes itself in such a way that the capacitive sensor is not giving a true signal. For example when a capacitive sensor is placed in a fuel tank it is normally characterized according to the shape of the tank so as to give a signal proportional to the amount of fuel in the container when the aircraft is in normal or level flight attitude. However, when the aircraft starts a sustained climb, or dive, the fuel is bound to shift in the tank so that more or less of the capacitive probe is covered with fuel and hence an incorrect reading will result. Oother conditions such as acceleration may also cause incorrect indications.

It is therefore an object of the present invention to provide a fluid gauging system which will give improved accuracy regardless of interfering aircraft conditions.

Another object is to provide a fluid gauging system which maintains accuracy when the fluid container changes attitude.

To accomplish the present objects, the invention provides for the use of a normal capacitive sensing system and a flow-meter type sensing system in such a way that the capacitive sensor is used during all conditions of normal or level flight and the flow-meter is used when a change in attitude occurs. Briefly, a fuel gauging system is arranged to give a signal to an amplifier indicative of the quantity of fluid remaining in a container whenever the aircraft is in level flight. The amplifier in turn drives the motor which positions an indicator to indicate the amount of fuel remaining in the container. When the aircraft changes attitude, a switch is operated to control a circuit for preventing the signal from the fuel gauging system from changing and applies the signal from a flowmeter through an integrator so that the flowmeter signal is subtracted from the fuel gauge signal applied to the amplifier. The amplifier continues to operate the motor and the indicator so that the indicator continuously shows the amount of fuel remaining in the container.

In most aircraft applications, an indication is desired of the mass of fuel remaining so the signal from the fuel gauging system and from the flow meter must be adjusted or compensated for fuel density to thereby provide signals indicative of mass. While the present invention is herein described in terms of a system for producing a mass output, it is to be understood that the concepts of the invention are applicable to systems other than a mass indicating system.

Figure 2:
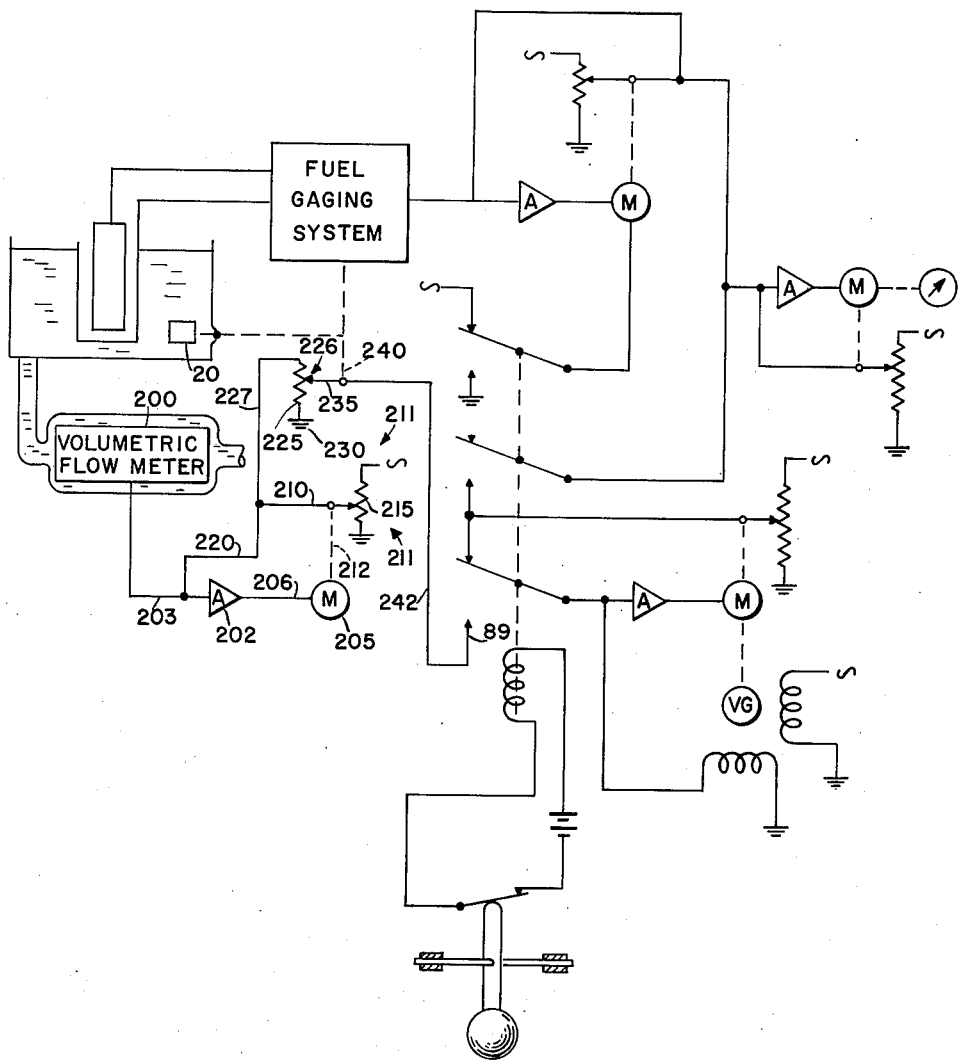

Referring now to the drawings in which:

FIGURE 1 shows a schematic diagram of the invention wherein a mass rate flow meter is used; and FIGURE 2 shows a schematic diagram of the invention wherein a volumetric flow meter is used.

In FIGURE 1, a tank or container 10 is shown having a capacitive type sensor 11 with an inner electrode 12 and outer electrode 13. Capacitive sensor 11 is shown connected to a fuel gauging system 15 by means of conductors 16 and 17. Also included in container 10 is a float 20 which is pivotally mounted to the container at flexible connection 21 and is mechanically connected as shown by dashed line 22 to the fuel gauging system 15. Fuel gauging system 15, the sensor 11 and the float 20 may be of the type shown in Patent 2,769,338 issued to H. M. Hermanson and assigned to the same assignee as the present invention. The above mentioned fuel gauging system has an output which varies according to the true mass of the fuel or liquid remaining in the container. Although the float 20 is shown to adjust the fuel gauge signal according to fuel density any kind of density sensor may be used for the same purpose.

In FIGURE 1 the output is shown as being conducted from the fuel gauging system to an amplifier 25 by conductor means 26. Amplifier 25 is the type which is capable of receiving an input signal of either a first or second phase to produce an output signal of either a first or second phase. Amplifier 25 is shown connected to a motor 30 in driving relationships by conductor means 31. Motor 30 is preferably of the two phase type which is capable of rotating in the first or second direction depending upon the phase of the input signal. The amplifier and motor combination may be such as described and claimed in the Upton Patent 2,423,534 assigned to the same assignee as the present invention. Motor 30 is shown to be connected by means of a mechanical connection 35 to control a potentiometer wiper 36 of a potentiometer 37. Wiper 36 cooperates with a winding 38 which is energized by source of alternating current voltage (not shown). The position of wiper 36 on winding 38 is indicative of the true mass of fuel remaining in the container 10 as shown in the above mentioned Hermanson patent. Potentiometer 37 may be the balance potentiometer of the above referred to Hermanson patent or may be a separate potentiometer whichever is desired. The voltage on wiper 36 is fed back to the input of the amplifier 25 by means of a conductor 40 for rebalance purposes. The voltage on wiper 36 is also fed to a second amplifier 45 by conductor means 46 and 47. Amplifier 45 is connected in controlling relationship to a motor 50 by conductor means 51. Motor 50 drives an indicator 55 by means of a mechanical connection shown as dashed line 56 and drives a rebalance wiper 60 of a potentiometer 61 by a mechanical connection shown as dashed line 63. Potentiometer 61 has a winding 62 which is energized from a source of alternating current voltage (not shown). The voltage on wiper 60 is fed back to the input of amplifier 45 by means of a conductor 65 for rebalance purposes. The amplifier 45 and motor 50 combination may be the same as that described above with regards to amplifier 25 and motor 30.

As thus far shown indicator 55 is controlled according to the mass of fuel in container 10 and its position is indicative thereof. This is the normal operation of the system so long as the aircraft is maintained in level flight but if the aircraft changes attitude such as in pitch or in roll, the liquid in container 10 will change position and the output from capacitive sensor 11 may then become erroneous. To overcome this error the following described circuit is incorporated.

The fuel or liquid going to or from the container 10 does so by means of a pipe 70 located at the bottom of container 10. A portion 71 of this pipe is shown enlarged for convenience and has a mass rate flow meter 72 disposed therein. Flow meter 72 may be of the sort described and claimed in copending application Serial No. 669,084 of Robert O. Maze filed July 1, 1957, and assigned to the same assignee as the present invention. The output of mass rate flow meter 72 is indicative of the mass rate at which liquid is flowing through it and is applied by conductor means 75 to an amplifier 76. Amplifier 76 drives a motor 77 by means of a voltage applied through a conductor means 78. The amplifier motor combination may again be the same as that described in regards to amplifier 25 and motor 30. Motor 77, by means of a mechanical connection shown as the dashed line 80, controls the position of a potentiometer wiper 81 of a potentiometer 82. Potentiometer 82 has a winding 83 energized from a source of alternating current voltage (not shown) and the position of wiper 81 on winding 83 is indicative of the mass rate of flow through flow meter 72. The voltage on wiper 81 is fed back to the input of the amplifier by a conductor 85 for rebalance purposes and is presented to a contact 89 of a switch 90 by a conductor 91.

Switch 90 is composed of three switch arms 92, 94 and 96 mechanically connected together so that they all operated simultaneously. Each of the switch arms is capable of one of two positions. As shown, the switch arms are in the upper position and switch arm 92 is engaging a contact 100 which is connected to a source of alternating current voltage not shown. Switch arm 92 is connected to motor 30 by a conductor means 102 and, motor 30 is made operable by the connection of conductor 102, switch arm 92 and contact 100 to the source of alternating current voltage. However, in the lower position switch arm 92 contacts ground connection 105 and motor 30 would be grounded out and would stop.

Switch arm 94 is connected to amplifier 45 by means of a conductor 107 and is shown in the upper position as contacting switch contact 108 which is not connected to anything so that in the upper position the only connection to amplifier 45 is from the fuel gauging system. In the lower position switch arm 94 contacts switch contact 110 which is connected to a potentiometer wiper 111 by means of a conductor 112. Potentiometer wiper 111 contacts potentiometer winding 115 which is connected to a source of alternating current voltage (not shown) for a purpose to be later described.

Switch arm 96 is shown connected to contact 118 which is in turn connected to potentiometer wiper 111 by means of conductor 112. The purpose of this connection will also be described later. In the lowered position, switch arm 96 contacts switch contact 89 so that the signal from the flow meter system is conducted to an amplifier 120 by conductor means 121 connected to switch arm 96. Amplifier 120 is connected to a motor 125 by a conductor means 126. Motor 125 controls the position of wiper 111 by means of a mechanical connection shown as dashed line 127. As explained, the signal from the flow meter is indicative of the mass rate of flow through the pipe 70 and to be useful in this system, this rate of flow signal must be integrated so that a signal indicative of the total mass of flow is given. This is accomplished by means of the amplifier-motor combination 120, 125. Whenever switch arm 96 is contacting contact 89 a signal indicative of mass rate of flow is being fed to amplifier 120 which signal is being amplified to drive the motor 125 so that the position of motor 125 at any time is indicative of the total amount of flow through the flow meter from the time the contact arm 96 engaged contact 89. If a motor were available which was perfectly linear this would be all that was necessary; however, it has been found that such a motor is not obtainable, so to overcome errors due to non-linearity, a velocity generator 130 is shown mechanically connected to motor 125 by means of a dashed line 131. Velocity generator 130 includes a winding 135 which is energized from a source of alternating current voltage (not shown) and the output is shown as taken from a winding 138 and fed back to the input of amplifier 120 by means of a conductor 139. Any surges which the motor might experience will cause the velocity generator to give an output which is of correct phase to oppose the surge and give the motor velocity generator combination a linear output. Since the position of motor 125 is indicative of the total mass of flow through tube 70 from the moment switch arm 96 contacts contact 89 the position of wiper 111 on winding 115 is likewise so indicative. When the switches are in the lower position the signal from wiper 111 is fed through conductor 112, contact 110, switch arm 94, conductors 107 and 47 to amplifier 45. The phase of this signal is such as to oppose the phase of the signal coming from wiper 36, when fuel is draining from the container, so that the output of the flow meter system appearing on wiper 111 subtracts from the output of the fuel gauging system appearing on wiper 36 and indicator 55 continues to indicate the total amount of fuel remaining in container 10. When the container is being refilled, the phase of the signal from the wiper 111 must be made the same as that from the wiper 36 so that the two outputs add to give the correct indication.

The apparatus for operating switch 90 may be any suitable condition responsive device but for purposes of illustration an attitude responsive apparatus is shown comprising a pendulous weight 150 which is mounted on a bar or rod 151 and has an extension 152. Rod 151 is arranged to pivot in bearings 153. Extension 152 is shown contacting a switch arm 155 so that switch arm 155 in turn contacts a contact 157 to complete a circuit consisting of a source of voltage 160 and a relay winding 163. Relay winding 163 is affective to control the position of switch arms 92, 94, and 96 by means of a mechanical connection 165. Whenever the circuit is thus closed the position of the switch arms 92, 94, and 96 will be in the upward position as shown in the FIGURE 1. When however, the aircraft changes attitude, pendulum 150 will swing about its axis through bar 151 so that switch arm 155 will disengage itself from contact 157 and relay 163 will become deenergized. Switch arms 92, 94, and 96 will then assume the lower position so that switch arm 92 contacts ground position 105 thereby stopping motor 30 and freezing the signal coming from wiper 36. Switch arm 94 contacts wiper 110 so that the signal from wiper 111 is applied to amplifier 45 and switch arm 96 contacts contact 89 so that the rate signal from the flow meter may be integrated to give a quantity output signal. Whenever the aircraft again resumes level flight the pendulum will again resume the position shown in FIGURE 1 and switch 155, 157 will be closed so that relay 163 is again energized thereby throwing switch arms 92, 94 and 96 into the upper position again. It should be understood that other factors than attitude may make it desirable to change from a capacitive system to a flow meter system. Acceleration, for example may cause the fuel to shift in the tank in which case switch 90 could be made responsive to an accelerometer. When other conditions are encountered, a suitable condition responsive device can be substituted for the attitude responsive device.

In order to zero the flow meter signal after the aircraft again assumes normal flying attitude it is desirous to have some means of driving motor 125 and wiper 111 back to their initial position. This is accomplished by feeding the signal from wiper 111 back to amplifier 120 through conductor 112, contact 118, switch arm 96 and conductor 121 to amplifier 120. The phase of this signal is such as to cause the amplifier to drive the motor back to zero so that the system is again ready for operation when the aircraft assumes an attitutde out of normal.

The system above described will provide an accurate indication of the mass of fuel remaining in the container under all conditions of attitude of the aircraft. Under some applications it may be desired to obtain a volume indication in which case the fuel gauging system need merely be one which produces a signal indicative of volume and instead of a mass rate flow meter a volume rate flow meter should be used.

If it is desired to have an indication of the mass of fuel remaining and at the same time using a volumetric flow meter rather than a mass rate flow meter all that need be done is to provide the volumetric flow meter with a density correction such as shown in FIGURE 2. Referring to FIGURE 2 the system is identical to that shown in FIGURE 1 with the exception of the flow meter circuit which alone will be described hereinafter. The volumetric flow meter 200 is shown having an output leading to an amplifier 202 by conductor means 203. Amplifier 202 is connected to a motor 205 by a conductor means 206. The amplifier 202 and motor 205 may be of the type above referred to in regards to amplifier 25 and motor 30. Motor 205 positions a wiper 210 of a potentiometer 211 by means of a mechanical connection shown as dashed line 212. Potentiometer 211 has a winding 215 which is energized from a source of alternating current voltage (not shown). Since the flow meter 200 is a volume rate flow meter the position of wiper 210 will be indicative of the volume rate of flow through pipe 70. The voltage on wiper 210 is fed back to the input of amplifier 202 by means of a conductor 220 for rebalance purposes and also to the upper portion of a potentiometer winding 225 of a potentiometer 226 by means of a conductor 227. The other end of winding 225 is connected to a ground connection 230. A wiper 235 cooperates with the winding 225 of potentiometer 226 and its position is governed according to the position of the float 20 by means of a mechanical connection shown as dashed line 240. It is seen therefore that as the density varies, the position of float 20 will vary and will cause wiper 235 to change position along the winding 225 according to density hence the signal from wiper 210 which is indicative of volume flow rate will be corrected for density and the voltage on wiper 235 will be indicative of mass flow rate. The voltage on wiper 235 indicative of mass flow rate is fed to switch contact 89 by means of a conductor 242 and this system operates the same as that shown in FIGURE 1 thereafter.

It is thus seen that an accurate quanity measuring apparatus has been devised which will provide correct indication of the amount of fluid in the container regardless of the attitude of the container.

Because various modifications may be made by those skilled in the art within the spirit of the invention it is intended that the scope of the invention be limited only to the extent of the appended claims.

I claim as my invention:

1. Apparatus of the class described comprising, in combination: measuring apparatus having a first normally variable output indicative of the quantity of material in a containing means; first means operable to prevent variation of said first output; second means operable upon operation of said first means to provide a second output indicative of the quanity of material going to or from the containing means; and third means connecting said first and second outputs to provide a total output indicative of the quantity of material in the containing means.

2. Apparatus of the class described comprising, in combination: fluid measuring apparatus having a first normally variable output indicative of the quantity of fluid in a container; first means operable to prevent variation of said first output; second means operable to provide a second output indicative of the quantity of fluid flowing to or from the container; third means operable to connect said first and second outputs to provide a total output; and fourth means substantially simultaneously operating said first, second and third means.

3. Apparatus for determining the quantity of fluid in a container which is subjected to changes in a condition comprising, in combination: a first measuring system having a normally variable output indicative of the quantity of fluid in the container when the condition to which the container is subjected is within predetermined limits; a second measuring system having an output indicative of the quantity of fluid flowing to or from the container; and condition responsive means operable upon deviation of the condition from the predetermined limits for fixing the output of the first measuring system and combining the outputs of said first and second measuring means.

4. Apparatus for determining the quantity of fluid in a container which is subjected to changes in attitude comprising, in combination: a first measuring system having a normally variable output indicative of the quantity of fluid in the container when the attitude of the container is within predetermined limits; a second measuring system having an output indicative of the quantity of fluid flowing to or from the container; and attitude responsive means operable upon deviation of the container attitude from the predetermined limits for fixing the output of the first measuring system and combining the outputs of said first and second measuring means.

5. Apparatus of the class described comprising, in combination: fluid measuring apparatus having a first normally variable output indicative of the mass of fluid in a container; means having a second output indicative of the mass rate of flow of fluid to and from the container; integrating means operable to convert said second output into a third output indicative of total mass flow to and from the container; and means operable upon a change of a predetermined condition for preventing variation of said first output, connecting said second output to said integrating means and connecting said third output to said first output to provide a signal indicative of the mass of fluid remaining in the container.

6. Apparatus of the class described comprising in combination: a capacitance type liquid sensing means having a first output normally variable in accordance with variations in the mass of a liquid in a container; a flowmeter having a second output variable in accordance with the mass rate of flow of liquid to and from the container; an integrator having an input adapted to be connected to said second output and having a third output; said third output being indicative of mass flow to and from the container when said second output is connected to said input; switching means operable to prevent variation in said first output, to connect said second output to said input and to connect said first output to said third output; indicator means connected to said first output; and condition responsive means for operating said switch means.

7. Apparatus of the class described comprising, in combination: first means for sensing the quantity of material in a container means and having a first normally variable output indicative thereof; second means for sensing the quantity of material going to or from the container means operable upon change of a condition and having a second output means operable to prevent variation of said first output and to combine said first and second outputs upon the change of the condition; and means connected to said first output to indicate the quantity of material in the container means.

8. Apparatus of the class described, in combination: a true mass liquid gauging system having a first normally variable electrical output of a magnitude indicative of the mass of liquid in a container means; voltage responsive means connected to said first output to indicate the mass of liquid in the containing means; a flowmeter having a second electrical output of a magnitude indicative of the mass rate of flow to and from the container means; integrator means having an input and a third output; and switch means operable to prevent variation of said first output, to connect said second output to said integrator input so that said third output is indicative of the mass of liquid flowing to and from said container means, and to connect said third output to said voltage responsive means.

9. Apparatus of the class described comprising, in combination: a fluid quantity gauging means having a first normally variable electrical output of a first phase and of a magnitude indicative of the quantity of fluid in a container means; flowmeter means having a second electrical output of a phase opposite to said first phase and a magnitude indicative of the quantity of fluid flowing from said container means; voltage responsive means connected to said first output for indicating the quantity of fluid in said container means; and means operable upon the happening of a predetermined condition to prevent variation of said first output, to initiate effective operation of said flowmeter means and to connect said second output to said voltage responsive means so that said second output subtracts from said first output; said voltage responsive means thereby continuing to indicate the quantity of fluid in said container means.

10. Apparatus of the class described comprising, in combination; fluid sensing apparatus having a first normally variable output indicative of the amount of fluid in a container; flowmeter apparatus having a second output indicative of the amount of fluid flowing to or from the container; means responsive to a condition adapted to prevent change in said first output and to connect said first and second outputs together so that said second output is algebraically combined with said first output; and means connected to said first output for indicating the amount of fluid in the container.

11. Apparatus of the class described comprising, in combination: containing means; capacitive type liquid gauging system for producing a signal of normally variable magnitude indicative of the quantity of liquid in said containing means; a flow meter system for producing a signal of magnitude indicative of the quantity of liquid flowing to and from said containing means; indicator means operable by signals from both said capacitive system and said flowmeter system; and means alternately connecting said capacitive system and said flowmeter system in controlling relation to said indicator means in accordance with the attitude of said containing means.

12. Apparatus for indicating the quantity of material in a container comprising, in combination: a gauging system for producing a first signal normally variable in accordance with the quantity of material in the container; a flowmeter system for producing a second signal in accordance with the quantity of material going to or from the container; means responsive to said first and second signal for indicating the quantity of material in the container; and means alternately connecting said first and second signals in controlling relation to said indicating means in accordance with variations in the attitude of the container.

References Cited in the file of this patent

UNITED STATES PATENTS

| | | |
|---|---|---|
| 2,610,052 | MacGeorge | Sept. 9, 1952 |
| 2,851,882 | Nottingham | Sept. 16, 1958 |
| 2,860,511 | Wickesser | Nov. 18, 1958 |